(12) United States Patent
Svetal et al.

(10) Patent No.: US 6,237,852 B1
(45) Date of Patent: *May 29, 2001

(54) MULTIPLE PLANE WEIGH PLATTER FOR MULTIPLE PLANE SCANNING SYSTEMS

(75) Inventors: Michael P. Svetal; Mohan LeeLaRama Bobba; Matt D. Schler; Gary J. Oldham, all of Eugene, OR (US)

(73) Assignee: PSC Scanning, Inc., Eugene, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/150,552

(22) Filed: Sep. 9, 1998

Related U.S. Application Data

(62) Division of application No. 08/539,584, filed on Oct. 5, 1995, now Pat. No. 5,834,708.
(60) Provisional application No. 60/000,052, filed on Jun. 8, 1995.

(51) Int. Cl.[7] ................................................. G06K 7/10
(52) U.S. Cl. .............................. 235/462.43; 235/462.14; 177/180; 177/238
(58) Field of Search .................... 235/462.43, 462.14, 235/483; 177/180, 238, 262, 181

(56) References Cited

U.S. PATENT DOCUMENTS

| 2,617,641 | 11/1952 | Marshall, Jr. et al. ............... 265/39 |
| 2,738,184 | 3/1956 | Hart ...................................... 265/27 |
| 4,064,954 | 12/1977 | Rock ..................................... 177/25 |
| 4,656,344 | 4/1987 | Mergenthaler et al. ............. 235/462 |
| 4,881,606 | 11/1989 | Halfon et al. ........................ 177/126 |
| 4,971,176 | 11/1990 | Nojiri et al. ............................ 186/61 |
| 4,971,177 | 11/1990 | Nojiri et al. ............................ 186/61 |
| 4,991,692 | 2/1991 | Nojiri et al. ............................ 186/61 |
| 5,086,879 | 2/1992 | Latimer et al. ........................ 186/61 |
| 5,139,100 | 8/1992 | Brauneis ........................... 177/25.15 |
| 5,206,491 * | 4/1993 | Katoh et al. ........................ 235/467 |
| 5,229,588 | 7/1993 | Detwiler et al. .................... 235/467 |
| 5,410,108 | 4/1995 | Williams et al. ................. 177/25.15 |
| 5,475,207 | 12/1995 | Bobba et al. ........................ 235/467 |
| 5,588,621 * | 12/1996 | Collings, Jr. et al. .......... 235/462.43 |
| 5,773,767 | 6/1998 | Collins et al. ...................... 177/126 |
| 5,886,336 * | 3/1999 | Tang et al. ........................... 235/383 |

OTHER PUBLICATIONS

Wincor Nixdorf WE02 Scanner Scale (Jan. 3, 2000); http://www.mch.sni. de/eng/products/retail/hardware/scanner/waage.html.

(List continued on next page.)

Primary Examiner—Karl D. Frech
Assistant Examiner—Daniel St. Cyr
(74) Attorney, Agent, or Firm—Lyon & Lyon LLP

(57) ABSTRACT

A multi-plane scanner having a dual plane scanner with a horizontal window and a vertical window and a load cell/weigh platter weighing apparatus such that the weigh platter itself is a dual plane object with vertical and horizontal sections. The size and orientation of the planes of the weigh platter correspond to the size and orientation of the scan windows of the dual plane scanner, and each plane of the weigh platter has a transparent area (typically central), or "platter window", corresponding to a respective scan window of the scanner for allowing transmission of scanned optical beams and optical barcode signals through each of the planes of the weigh platter. The platter is sufficiently rigid to permit accurate weighing whether the object being weighed is placed solely on the horizontal section of the platter or in part on the vertical section. The vertical and horizontal sections of the platter are sealed together to prevent passage of debris therebetween.

43 Claims, 10 Drawing Sheets

OTHER PUBLICATIONS

Orion Scanner and Scale Installation and Maintenance Manual, pp. A2–A4 (1989).

PSC Inc. brochure from PSC web page on the Magellan® Scanner/Scale (http://www.pscnet.com/magelspe.htm) (1997); the Magellan® Scanner/Scale is the scanner/scale as described in the background of the present application.

NCR Model 7870 Scanner/Scale User's Guide excerpts (pp. i, xiii through xvi, 3–16 through 3–18 (1993)).

Brochure from NCR web page on the NCR Model 7870 Bi–Optic Scanner and Scanner/Scale (http.//www.ncr.com/product/retail/products/catalog/7870.shtml (1997). See excerpts from the 1993 User's Guide above.

Brochure from NCR web page on the NCR Model 7875 Bi–Optic Aggressive Read Scanner/Scale (http://www.ncr-.com/product/retail/products/catalog/7875.shtml (1997).

* cited by examiner

MULTIPLE PLANE WEIGH PLATTER FOR MULTIPLE PLANE SCANNING SYSTEMS

RELATED APPLICATIONS

This application is a division of Ser. No. 08/539,584 filed Oct. 5, 1995 noe U.S. Pat. No. 5,834,208 which is a continuation-in-part of provisional application Ser. No. 60/000052 filed Jun. 8, 1995 which is hereby incorporated by reference.

BACKGROUND OF THE INVENTION

The field of the present invention relates to fixed optical reading systems, for example bar code scanning systems, which include multiple windows through which optical reading may be accomplished.

Fixed barcode scanners having multiple windows capable of reading objects in a variety of orientations have been on the market for some time. One such "multi-plane" scanner is described in U.S. Pat. No. 5,475,207 entitled "Multiple Plane Scanning System for Data Reading Applications", which is hereby incorporated by reference. These multi-plane or "multi-window" scanners are high performance scanners which use one or more scanned optical beams to generate multiple scan patterns. Mechanically, these scanners have one or more scan engines and multiple scan windows oriented in different planes from each other, instead of a single scan window as in single-plane scanners. One of the scan windows is usually oriented horizontally, defining a horizontal scan plane, while the other window or windows are oriented to have significant vertical components and define additional substantially vertical scan plane (s). The additional vertical scan plane(s) enable the scanner to successfully read a barcode from a larger fraction of the surface of the object for a given object orientation.

Horizontal window barcode scanning systems which also include a weigh scale apparatus have also been available for several years. One such "scanner scale" weighing apparatus is described in U.S. Pat. No. 5,410,108, which is hereby incorporated by reference. The weighing apparatus may take the form of a load cell which bears a rigid framework referred to hereinafter as a "spider". The spider supports a weigh platter onto which objects are placed to be weighed.

Alternately, the apparatus may be a "spiderless" scale in which the weigh platter is sufficiently rigid in itself to obviate the need for a spider. The weigh platter may comprise a horizontal flat piece of rigid material such as metal or a combination of metal amd plastic with an optically transparent portion corresponding to a horizontal scan window. The transparent portion allows transmission of optical beams out from a scan engine and transmission of optical barcode signals back into the scanner. The load cell, which is well-known in the art, usually comprises a machined piece of aluminum with one or more strain gauges attached thereto. When an object is placed on the weigh platter, the mechanical stress thus applied to the load cell generates electrical signals from the strain gauges, and these signals are in turn used to determine the weight of the object. When incorporated as part of an optical barcode scanning system, the load cell, spider, and weigh platter may preferably comprise a separate sub-assembly from the optical scanner.

In one device such as the 1994 version of the Spectra-Physics MAGELLAN™ scanner/scale, the load cell and spider are positioned below the scan engine, and vertical support members are connected to the spider, extend upward around the scanner, and are connected to the weigh platter, which is positioned over the scan engine.

Fixed optical barcode scanners with multiple scan planes have been combined with a weighing apparatus such as the Spectra-Physics MAGELLAN™ scanner/scale. The MAGELLAN™ scanner scale is a dual plane scanner having a vertical scan plane and a horizontal scan plane with a horizontal weigh platter.

Multiple plane scanners such as the MAGELLAN™ unit, however, may encounter several problems when a weigh scale is being incorporated. The addition of a second scan plane adds to the size of the scan unit. Since these systems are often used in locations where space is a significant limitation, such as a supermarket checkout stand, the addition of a second scan plane often comes at the expense of decreased area of the horizontal weigh platter. This decrease in area increases the likelihood that the vertical scan components, vertical scan window, and their associated housing will interfere mechanically with an object placed on the weigh platter to be weighed. Moreover, the limited size of the weigh platter may result in an object being weighed (depending upon its size) to extend past the edge of the platter onto the counter potentially resulting in an inaccurate weight measure.

In addition, horizontal single plane scanners with weigh platters typically have an air gap which completely surrounds the platter, allowing dust, dirt, and debris to fall around the scanner (but not on the horizontal scan window) so as not to interfere with scanner function. Moreover, the weigh platter may simply extend beyond the horizontal extent of the horizontal plane scanner.

In a dual plane scanner, since there can be no air gap or weigh platter extension on the side of the weigh platter adjacent the vertical scan window, debris may accumulate under the weigh platter which in turn may obstruct the horizontal scan window or may inhibit proper scale operation.

SUMMARY OF THE INVENTION

The present invention relates to optical reading systems, such as for example barcode scanning systems, which incorporate multiple plane scanning. In its preferred application, the invention relates to a multiple scan plane (two or more planes) scanning systems incorporating a multi-plane cover. A first preferred embodiment comprises a dual plane scanner and a load cell/weigh platter weighing apparatus, wherein the weigh platter itself is a dual plane object. The size and orientation of the planes of the weigh platter correspond to the size and orientation of the scan windows of the dual plane scanner, and each plane of the weigh platter has a transparent area, or "platter window", corresponding to a respective scan windows of the scanner, thereby allowing transmission of scanned optical beams and optical barcode signals through each of the planes of the weigh platter.

DETAILED DESCRIPTION OF PREFERRED EMBODIMENTS

Figure 1:
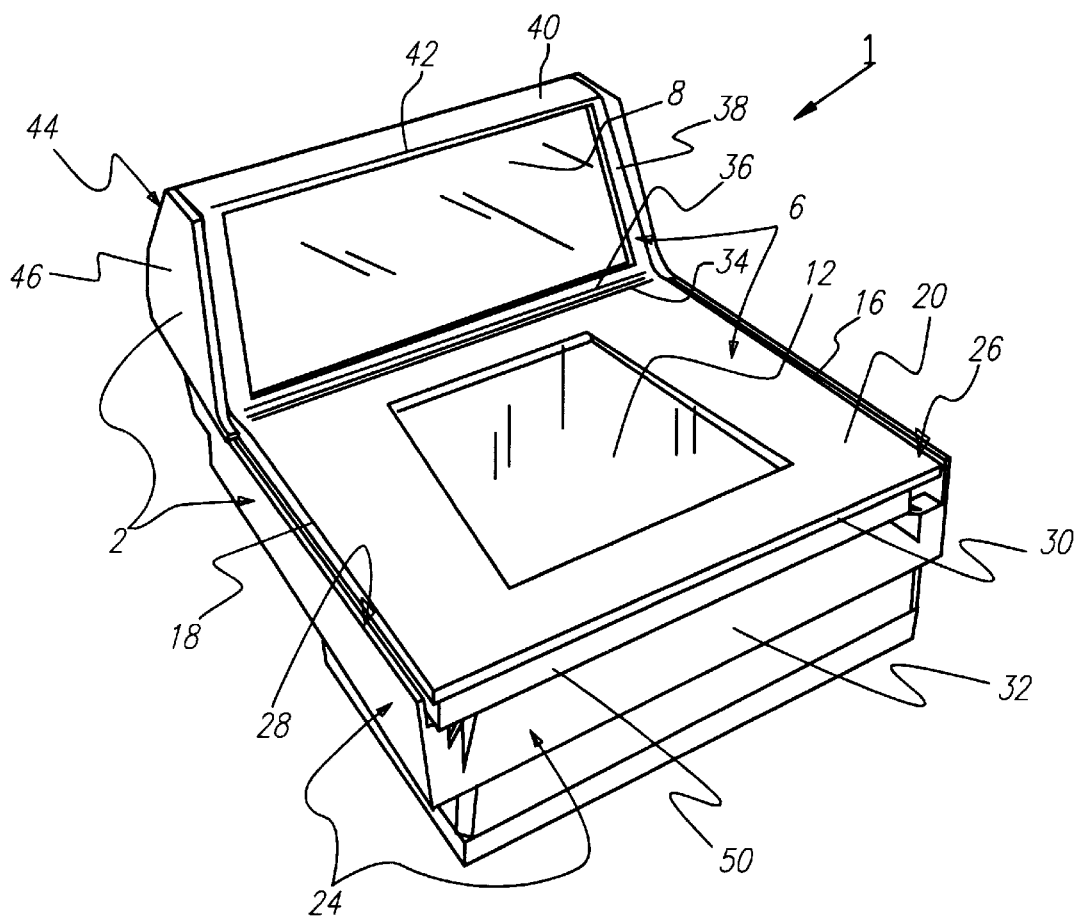
FIG. 1 is a perspective view of a dual plane scanner with a dual plane spiderless weigh platter according to the present invention.

The preferred embodiments will now be described with reference to the drawings. FIGS. 1–5 illustrate a two-plane scanner/weighing apparatus 1 including a scanner 2 with an integral load cell 4 and a two-plane spiderless weigh platter 6. When assembled the vertical platter window 8 is positioned in front of the vertical scan window 10 and the horizontal platter window 12 is positioned over the horizontal scan window 14. This relative positioning of the platter windows 8, 12 to the scan windows 10, 14 allows optical beams generated by the scan engine(s) to pass out through the scan windows and platter windows, and allows the resulting optical signals from a scanned barcode to pass in through the platter windows and the scan windows for detection and decoding. The window 8 may be oriented perfectly vertical, or it may be angled somewhat from absolute vertical as best shown in FIG. 3.

The lateral side edges 16, 18 of the horizontal section 20 of the weigh platter 6 and the horizontal scan housing portion 24 form air gaps 26, 28 on the lateral side edges (the right and left sides as viewed in FIG. 1) of the weigh platter 6, while the front edge 30 of the horizontal plane of the weigh platter 6 extends beyond the front 32 edge (i.e., the edge nearest the checker) of the horizontal scanner housing portion 24. The back edge 34 of the horizontal section of the weigh platter is rigidly connected to the bottom edge 36 of the vertical section 38 of the weigh platter, thereby forming an integral structure with a continuous surface, thereby preventing debris from passing below the weigh platter 6 which could obstruct the horizontal scan window 14 or could adversely affect scale performance. The two-plane weigh platter 6 may be fabricated from a single piece of material (preferably metal) or may be assembled from multiple pieces provided it comprises a single rigid structure as described herein.

One variation of this embodiment has a horizontal extension 40 of the weigh platter rigidly connected to the top edge 42 of the vertical platter section 38 of the weigh platter. This extension of the weigh platter 6 serves to further inhibit passage of debris between the vertical scanner window 10 and the vertical platter window 8 which would obstruct the vertical scanner window 10. The extension may be further extended downward behind the back surface 44 of the scanner housing portion 46 (see downward extension 43 in FIG. 5). The extended weigh platter may be fabricated in a single piece structure or assembled from multiple pieces provided it comprises a rigid overall structure with the sealed connection 35.

The horizontal platter window 12 is preferably constructed of a material which is shatter resistant and wear resistant such as sapphire, wear resistant coated glass (such as the wear-resistant glass with diamond-like coating described in U.S. Pat. No. 5,594,231, or tin-oxide since items being scanned are often dropped onto or dragged across the horizontal window 12. The vertical platter window 8 is generally subject to less impact and scratching action and likely would not require quite as an expensive material as the horizontal window, but should still preferably be constructed to have some scratch and impact resistance. Since the scanner housing windows 10, 14 are protected from impact by the weigh platter windows 8, 12, they need not be constructed from expensive scratch resistant material. Alternately, though the scanner internals would be somewhat more exposed, the housing windows 10, 14 may comprise mere openings (i.e., no glass covers) since the platter windows 8, 12 alone may provide adequate protection for internal components.

Figure 2:
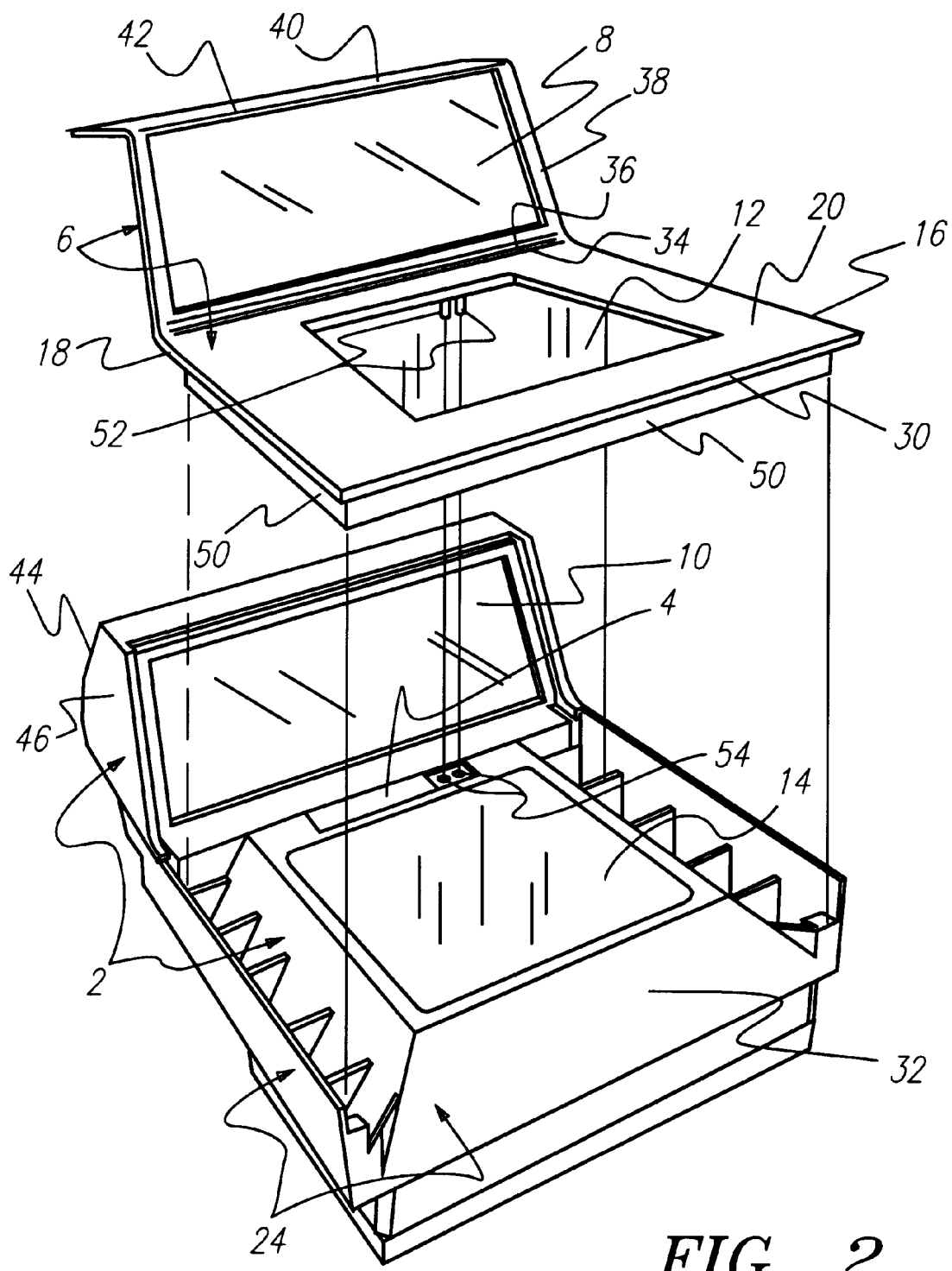
FIG. 2 is an exploded perspective view of the scanner and weigh platter of FIG. 1 showing an integral load cell.
Figure 3:
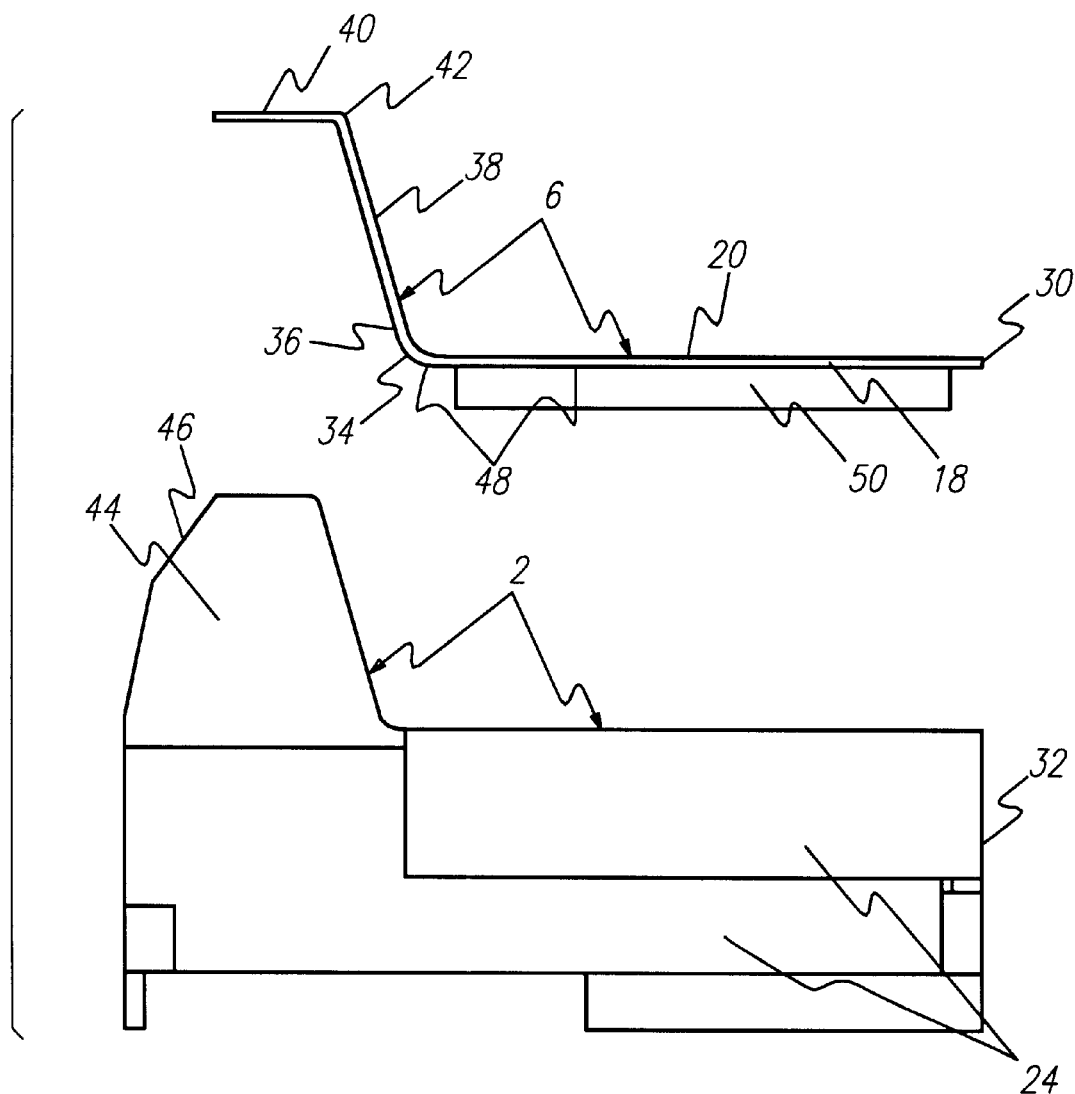
FIG. 3 is an exploded right side elevation view of the scanner and weigh platter of FIG. 1.
Figure 4:
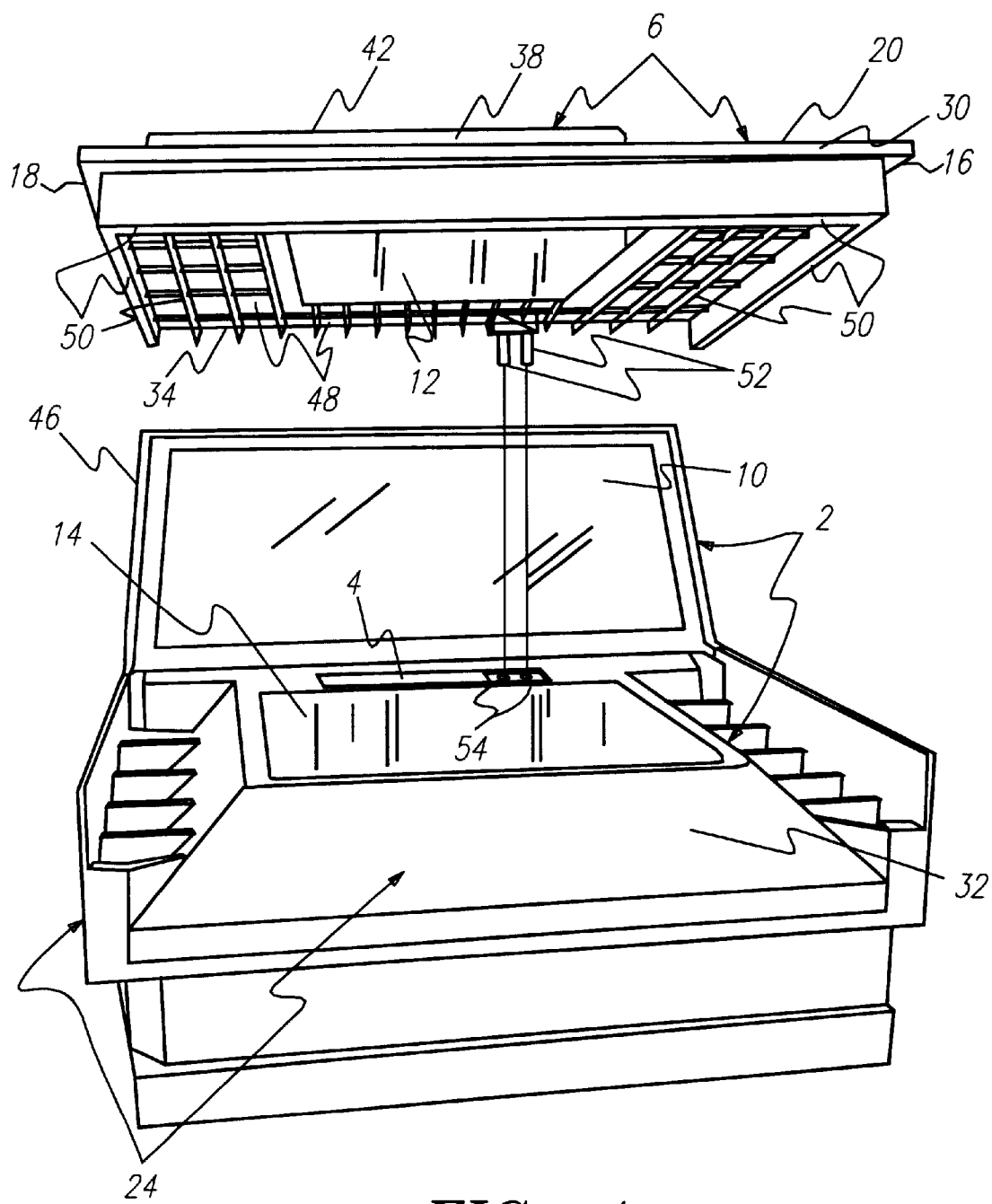
FIG. 4 is an exploded front perspective view of the scanner and weigh platter of FIG. 1 showing an integral load cell.

In FIGS. 2 and 4 the load cell 4 is shown integrally mounted on the top of the horizontal scanner housing portion 24, and is rigidly but removably connected to the bottom 48 of the two-plane weigh platter 6. The integral mounting of the load cell reduces the overall bulk of the two-plane scanner/weighing apparatus 1. In its preferred construction, the spiderless weigh platter 6 is constructed in a manner that insures rigidity sufficient to bear the weight of an object being weighed and sufficient to maintain its two-plane geometry and prevent the vertical scanner housing portion 46 from interfering with the weighing process. One such construction would be the incorporation of stiffening ribs 50 into the structure of the platter 6.

Also depicted in FIGS. 2 and 4 is a coupling mechanism for rigidly but removably connecting the two-plane weigh platter 6 to the load cell 4, comprising a pair of precision machined pins 52 attached to the bottom 48 of the two-plane weigh platter 6, and a mating set of precision machined holes 54 in the load cell 4. By such a construction, the weigh platter 6 is readily removable by pulling up on the platter, the pins 52 sliding out of the holes 54. Any rigid but removable coupling mechanism may be substituted for the pin/hole mechanism depicted here.

The two-plane weight platter embodiment solves two of the problems discussed in the background section. First, the vertical section 38 of the weigh platter 6 at the side adjacent the vertical scan window 10, being connected to and moving with the horizontal section 20, prevents debris from falling therebetween and under the weigh platter 6 on that side and obstructing the horizontal scan window. Second, the vertical section 38 of the weigh platter 6 prevents the object being weighed from coming into contact with the vertical scan window 10, so the vertical scan window 10 will not interfere with the weighing process.

The weigh platter preferably has bottom extensions which extend below the planar surface of the window 14 to prevent debris or liquids from contacting the window 14. Moreover, the side surfaces (i.e. both lateral sides and the side next to the checker) of the horizontal scan housing portion 24 are sloped to channel debris and liquids down and away from the window 14. The sides of the weigh platter 6 (such as the stiffening ribs 50) may extend downwardly to provide additional baffles to further inhibit debris or liquids from contacting the window 14. Alternately, the downwardly extending sides may be disposed in a trough and be provided with additional spill control and air gap maintenance thereby as disclosed in U.S. Pat. No. 5,410,108, which is incorporated by reference.

Figure 5:
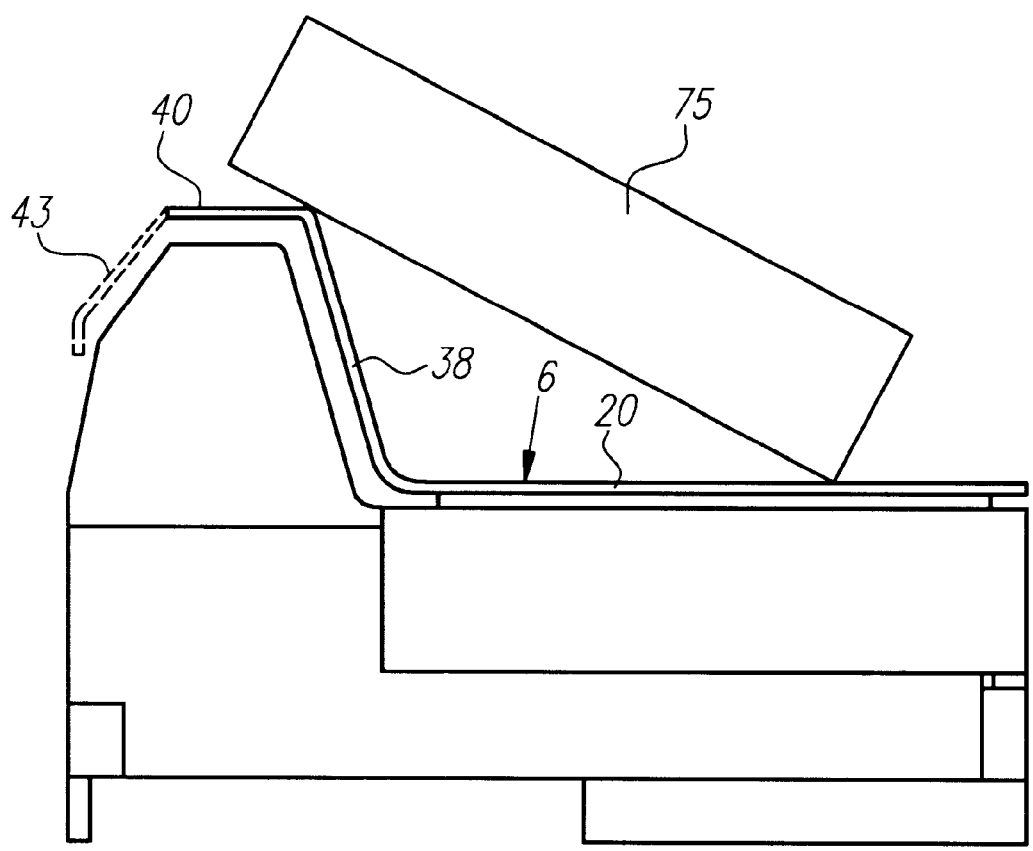
FIG. 5 is a side view of the apparatus of FIGS. 1–4 with an oversized item being weighed.

The multiple plane weigh platter 6 also facilitates weighing of oversized objects. With existing weigh platters, if the length of an object to be weighed exceeds the length of the horizontal weigh platter, the object may come in contact with the housing or the counter resulting in inaccurate weight measurement. FIG. 5 illustrates the apparatus 1 with an oversized object 75 being weighed on the multi-plane platter 6. One end of the object rests on the horizontal section 20 and the other end rests on the vertical section 38. Were the object flexible, such as a large bag produce, the bag may even be laid over the vertical housing portion 46 on the horizontal extension 40 of the weigh platter or even onto the downward extension 43 behind the back surface 44 of the vertical scanner housing portion 46.

To achieve potential reduction in size and material/manufacture cost, the load cell 4 may be incorporated directly into an upper section of the horizontal scanner housing portion 24, instead of comprising a separate subassembly. The weigh platter 6 is borne by the load cell 4 either directly or via a spider such as in alternate embodiments described below. In so called "spiderless" designs, the weigh platter itself is made sufficiently rigid to bear the object being weighed. By combining the weighing device and scanner in a single unit the overall size of the scanner/weighing device combination may be reduced compared to earlier devices at potentially reduced cost of material and/or manufacture.

Figure 6:
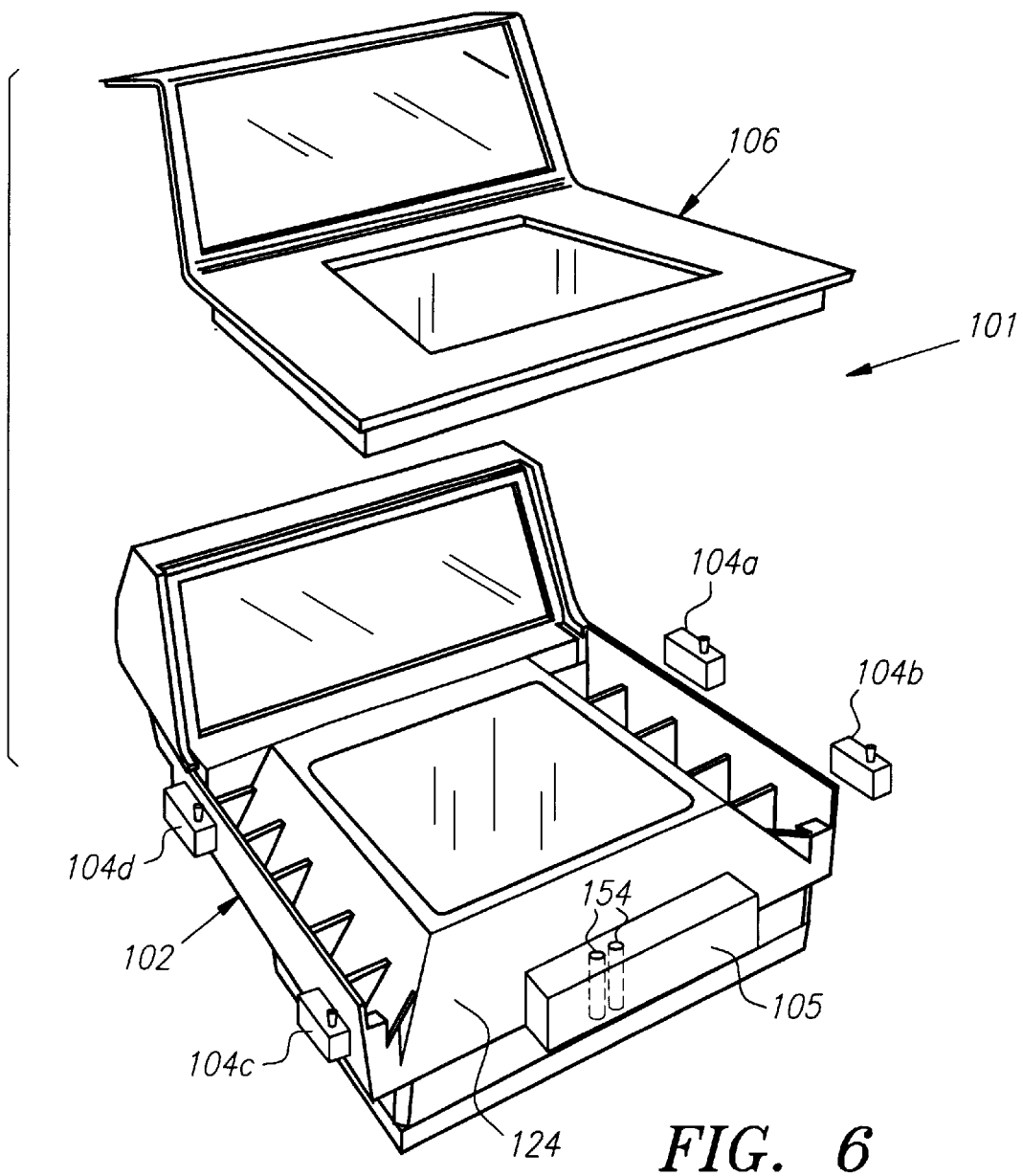
FIG. 6 is an exploded view of an alternate apparatus having a spiderless design with multiple load cells.

The apparatus 1 of FIGS. 1–4 centrally locates the load cell 4 between the vertical section 38 and the horizontal section 20. FIG. 6 illustrates an alternate apparatus 101 in which the load cell 105 (with the holes 154, 154 for the pins) is located at an opposite end of the horizontal scanner housing portion 124 of the scanner 102. The weigh platter 106 is more greatly cantilevered, but may be designed to fall within load cell specifications.

Though a single load cell and pin mounting design may be preferred, the apparatus may be configured with multiple load cells. FIG. 6 also illustrates another alternate embodiment comprising multiple load cells 104a, 104b, 104c, 104d spaced about the horizontal portion of the scanner 102. Depending upon particular design constraints, multiple load cells may not require pin connection such as preferred for the single load cell design previously described.

Figure 7:
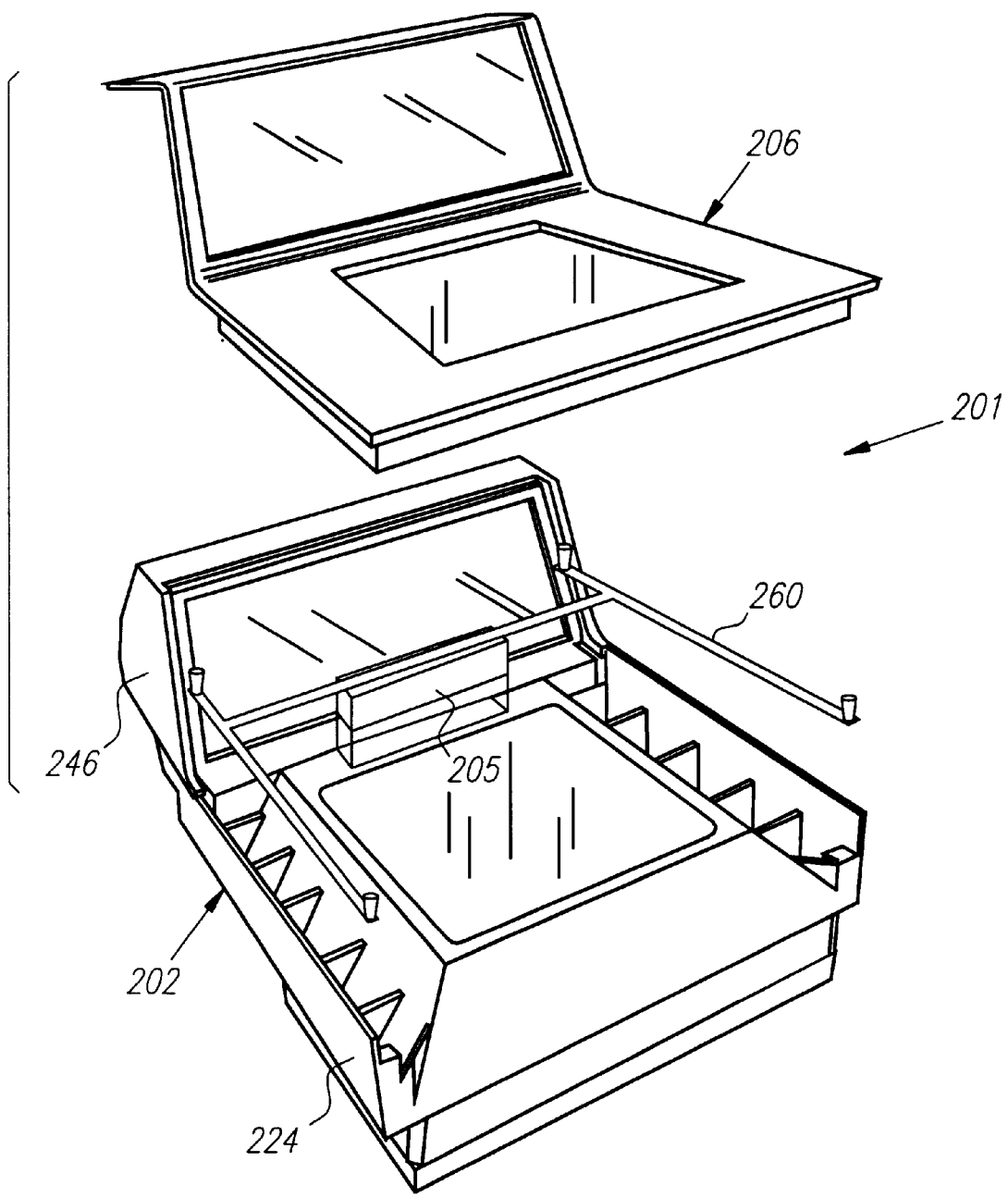
FIG. 7 is an exploded view of another alternate apparatus having a spider with a load cell.

Alternatively, a spider may be rigidly but removably connected to the load cell, which in turn bears the two-plane weigh platter. FIG. 7 illustrates another alternate apparatus 201 having an integral spider 260 having a single load cell 205. In this alternate embodiment, though the spider 260 provides additional stiffness to reduce the rigidity required of the weigh platter itself, the two-plane weigh platter 206 should still possess rigidity sufficient to maintain its two-plane geometry and prevent the vertical scanner section 246 of the scanner 202 from interfering with the weighing process. In another alternative embodiment, the load cell 205, spider 260, and two-plane weigh platter 206 may comprise a separate subassembly from the horizontal scanner housing portion 24 and vertical scanner housing portion 246. In this embodiment, the load cell 205 is placed between the vertical housing portion 246 and the horizontal housing portion and rigidly connected to the spider by suitable horizontal or vertical support members.

Figure 8:
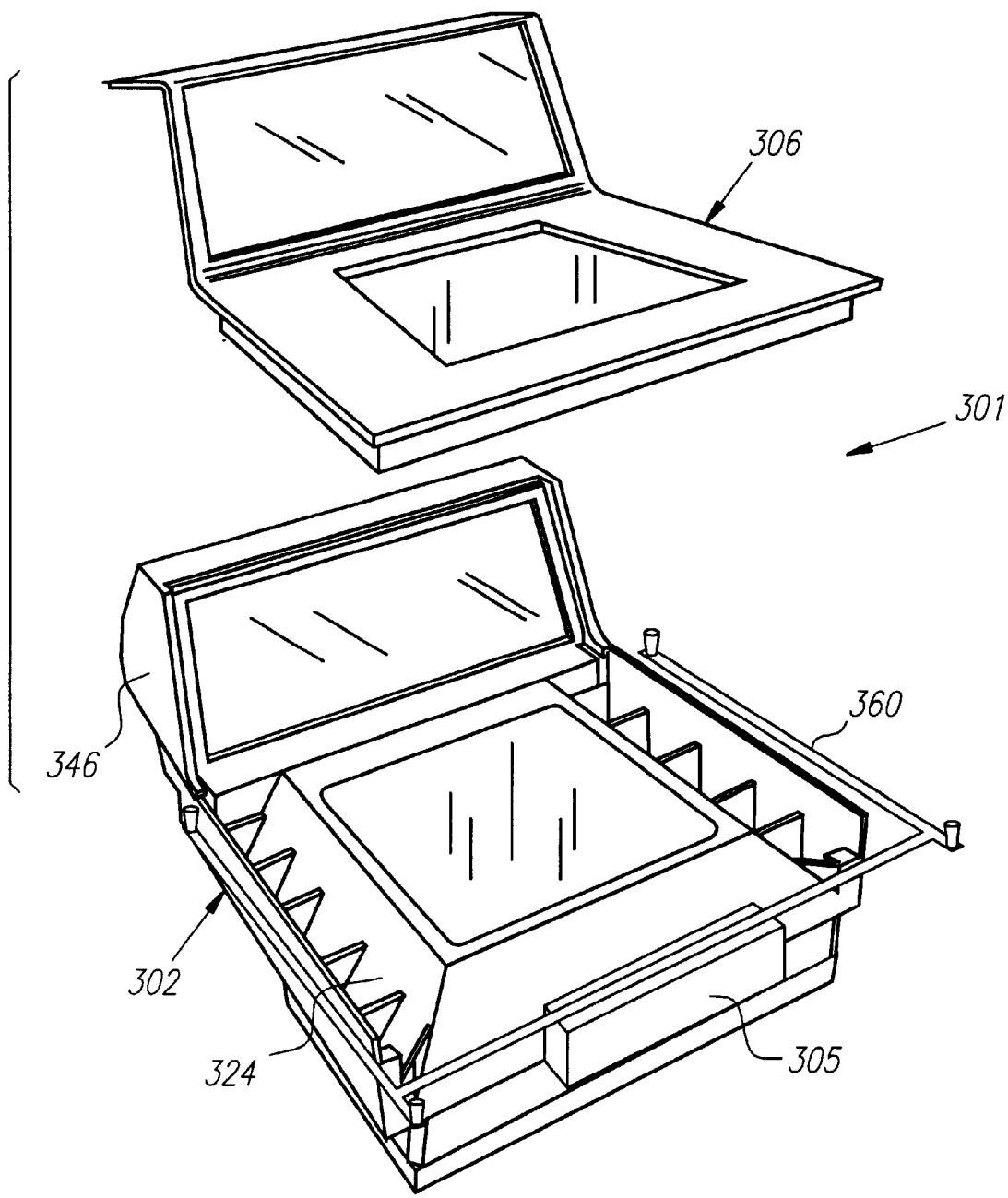
FIG. 8 is an exploded view of another alternate apparatus also having a spider with a load cell.

Alternately, the load cell upon which the spider is mounted may be placed next to or below the scanner housing portions and rigidly connected to the spider by suitable horizontal or vertical support members, respectively. FIG. 8 illustrates another alternate apparatus 301 having an integral spider 360 having a single load cell 305. In this alternate embodiment, the two-plane weigh platter 306 possesses rigidity sufficient to maintain its two-plane geometry and prevent the vertical scanner section 346 of the scanner 302 from interfering with the weighing process. The load cell 305 is placed on an end of the horizontal scan housing portion 324 opposite to the vertical housing portion 346 (i.e. on the checker side).

Figure 9:
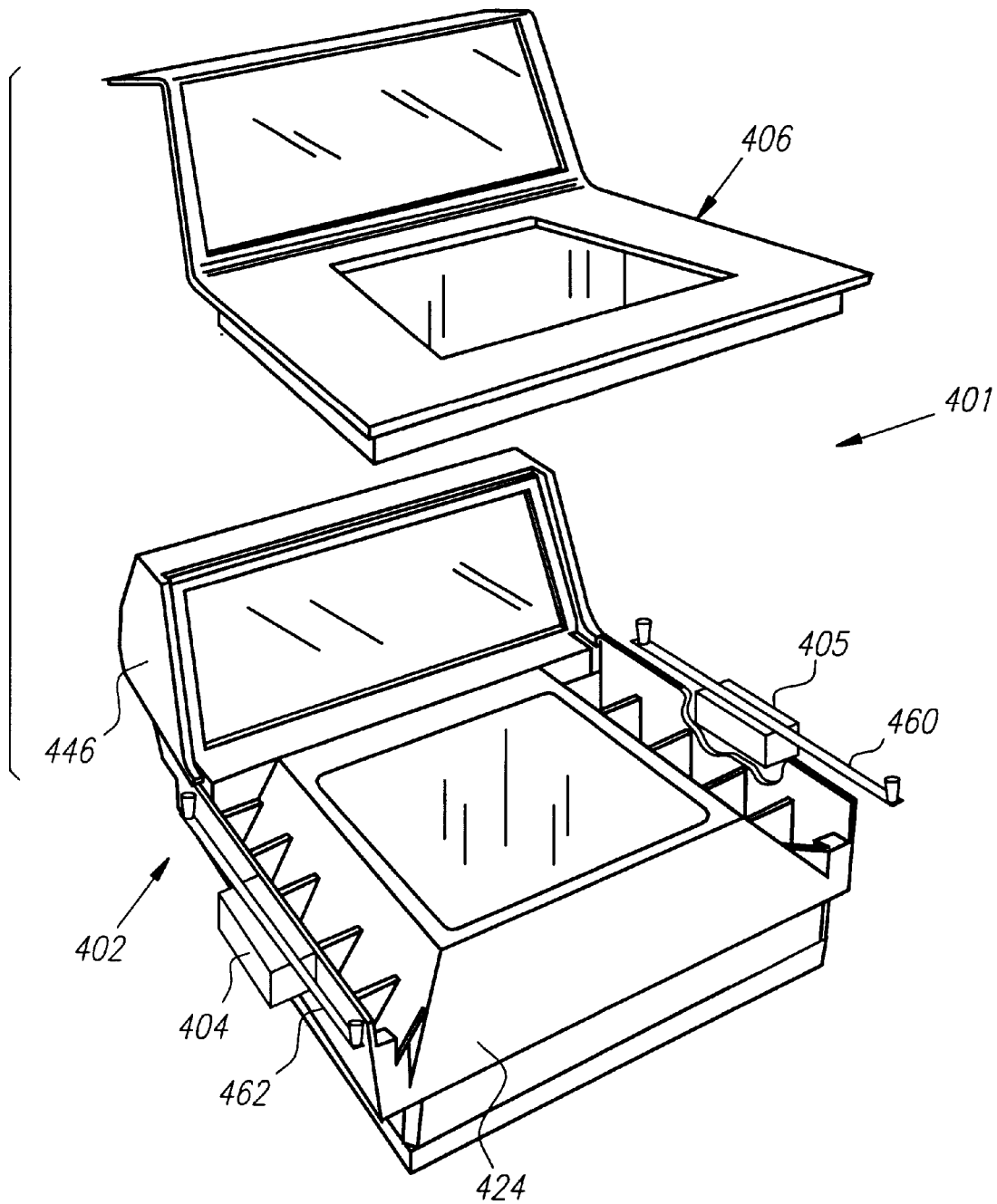
FIG. 9 is an exploded view of another alternate apparatus having a spider with multiple load cells.

Spider designs may also incorporate multiple load cells. In the apparatus 401 of FIG. 9, separate spider legs 460, 462 (they could be connected as a single spider as in FIG. 8 for example) are mounted on load cells 405, 404 respectively. The spider legs 460, 462 provide additional stiffness to reduce the rigidity required of the weigh platter 406 itself, but the two-plane weigh platter 206 should still possess rigidity sufficient to maintain its two-plane geometry and prevent the vertical scanner section 446 of the scanner 402 from interfering with the weighing process.

In each of the above embodiments, the load cell may located within the scanner envelop (such as load cell 205 in FIG. 7) or outside such as load cell 305 as illustrated in FIG. 8. Similarly. the spider may be incorporated outside the scanner envelop (such as spider 360 in FIG. 8) or alternately inside the scanner envelop (such as spider 260 in FIG. 7) depending upon the specific apparatus configuration.

The disclosed embodiments of the multiple plane weigh platter may be combined with any suitable weighing device and with any multiple plane optical reading device without altering the concept of the present invention. Alternately, the platter may merely comprise a cover for a multi-plane scanner (i.e. a scanner having no scale). In the "no-scale" embodiment, the multi-plane cover would still provide spill and mechanical protection for the internal components, but may not require as stiff a construction as does the weigh platter scale version.

The embodiments disclosed may be modified in various ways without departing from the fundamental inventive concept presented hereinabove. Further modifications may include, but are not limited to: the number of scan planes and weigh platter planes; the method of manufacturing the weigh platter; the mechanical connection between the weigh platter and the weighing device; the particular nature of the weighing device; and the positioning of the weighing device (integral to the scanner or as a separate subassembly).

Though the multi-plane weigh platter has been shown and described with respect to a laser scanner such as the Spectra-Physics MAGELLAN™ scanner, it is intended that scanner upon which the weigh platter is constructed may comprise any sort of data reading device including scanning laser beam(s), CCD, video, LED, or the like.

Though the multi-plane weigh platter has been described as useful for multi-plane scanner, it may also be used in a single plane (either horizontal or vertical) that may have additional components. Envision for example a scanner/scale 1 of FIG. 1 having only a vertical window and no horizontal window. A multi-plane weigh platter for such a scanner/scale would only require a a vertical window (the horizontal portion could be entirely opaque).

Figure 10:
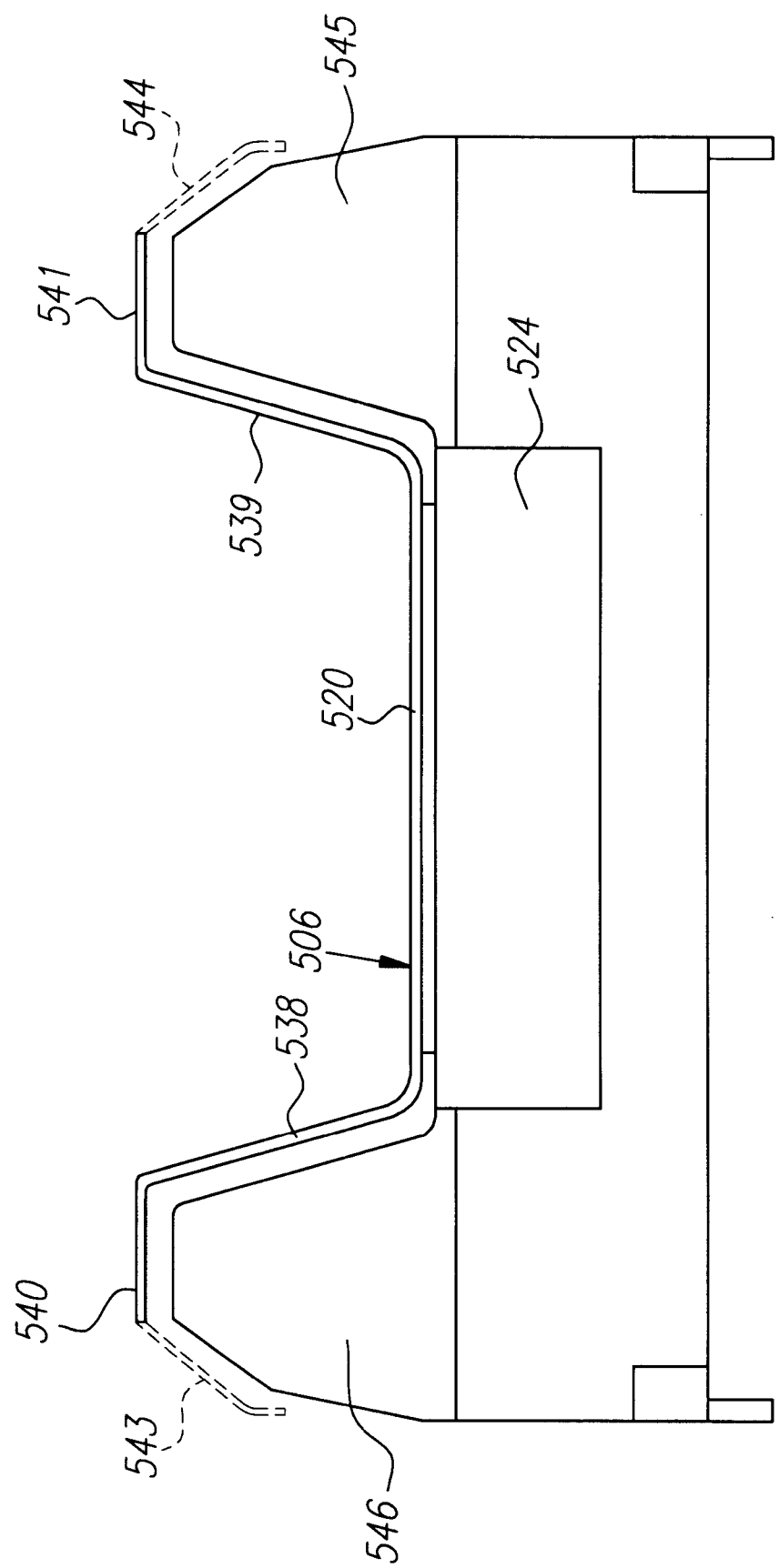
FIG. 10 is a side view of a another alternate apparatus illustrating three planes.

Though the weigh platter has been described with respect to dual-plane scanners, additional scan planes can be accommodated. For example in FIG. 10, a three-plane apparatus 501 is illustrated having two vertical scan housing portions 546, 545 and a horizontal scan housing portion 524. Such a device may have one, two or three windows through which scanning may be accomplished. The multi-plane cover or weigh platter 506 has two vertical sections 538, 539 and a horizontal section 520. Each platter section has a window (if required) corresponding to each respective scan housing window. The vertical platter sections may include horizontal extensions 540, 541 and further include downwardly extending vertical extensions 543, 544 if desired to provide further protection.

Thus, a multiple plane optical scanning system has been shown and described herein which incorporates a multiple plane spiderless weigh platter and an integrally mounted load cell. Though certain examples and advantages have been disclosed, further advantages and modifications may become obvious to one skilled in the art from the disclosures herein. The invention therefore is not to be limited except in the spirit of the claims that follow.

What is claimed is:

1. A multi-plane optical reader comprising
a lower housing portion with a horizontal window;
a first upper housing portion with a first vertical window positioned above and to one side of the lower housing portion;
a removable external cover having (a) a horizontal section, including a window of transparent material disposed over the horizontal window of the lower housing portion, (b) a first vertical section rigidly connected to the horizontal section, the first vertical section including a window of transparent material disposed adjacent the first vertical window of the first upper housing portion.

2. A multi-plane optical reader according to claim 1 further comprising
a second upper housing portion with a second vertical window positioned above and to one side of the lower housing portion on a side opposite to the first upper housing portion,
wherein the external cover includes a second vertical section attached to the first vertical section and extending over the second upper housing portion, and wherein the first vertical section, the second vertical section and the horizontal section are constructed with a one-piece integral frame.

3. An optical reader comprising
a lower housing portion having a horizontal surface;
a first upper housing portion with a first vertical opening positioned above and to a first side of the lower housing portion;
a second upper housing portion with a second vertical opening positioned above and to a second side of the lower housing portion opposite to the first upper housing portion;
a removable external cover having (a) a central horizontal cover section disposed over the lower housing portion, (b) a first upper cover section integral with the central cover section and disposed in front of the first upper housing portion, (c) a second upper cover section integral with the central cover section and disposed in front of the second upper housing portion.

4. An optical reader according to claim 3 wherein the central horizontal cover section, the first upper cover section, and the second upper cover section are constructed with a one-piece integral frame.

5. An optical reader according to claim 3 wherein the first upper cover section includes a cover portion extending over a top of the first upper housing portion.

6. An optical reader according to claim 3 wherein the external cover comprises a weigh platter.

7. An optical reader according to claim 6 further comprising
a spider connected to at least one load cell for supporting the removable external cover.

8. An optical reader according to claim 7 further comprising a coupling mechanism for rigidly but removably connecting the weigh platter to the load cell.

9. An optical reader according to claim 8 wherein the coupling mechanism comprises a pair of precision machined pins attached to the weigh platter and a mating set of precision machined holes in the load cell.

10. An optical reader according to claim 3 wherein the external cover comprises a weigh platter, the weigh platter being constructed and arranged with sufficient rigidity such that an object is accurately weighed when placed with one end on the central cover section and one end on the first upper cover section.

11. An optical reader comprising
a lower housing portion having a horizontal surface;
an upper housing portion with a vertical window positioned above and to one side of the lower housing portion;
a weigh platter disposed over the lower housing portion and having (a) a horizontal section extending over the horizontal surface, (b) a vertical section rigidly connected to the horizontal section, the vertical section including a window of transparent material.

12. An external cover for an optical reader, the optical reader having a horizontal surface and a vertical scan window disposed to one side of the horizontal surface, said external cover comprising
a horizontal section constructed and arranged for positioning over the horizontal surface of the optical reader; and
a vertical section rigidly connected to said horizontal section, said vertical section including a window of transparent material constructed and arranged for positioning adjacent the vertical scan window;
wherein said external cover is separately removable from the optical reader.

13. An external cover according to claim 12, wherein said vertical section and said horizontal section are sealed together to prevent passage of debris therebetween.

14. An external cover according to claim 12 wherein the horizontal section and the vertical section are constructed with a one-piece integral frame.

15. An external cover according to claim 12 wherein the external cover comprises a weigh platter.

16. An external cover according to claim 15 further comprising
at least one load cell;
a spider connected to at the least one load cell for supporting the removable external cover.

17. An external cover according to claim 16 further comprising a coupling mechanism for rigidly but removably connecting the spider to the load cell.

18. An external cover according to claim 15 further comprising at least one load cell and a coupling mechanism for rigidly but removably connecting the weigh platter to the load cell.

19. An external cover according to claim 12 wherein the external cover comprises a weigh platter, the weigh platter being constructed and arranged with sufficient rigidity such that an object is accurately weighed when placed with one end on the central cover section and one end on the first upper cover section.

20. An optical reader comprising
a reader housing including a lower housing portion and a first upper housing portion, the first upper housing portion having a first vertical window positioned above and to one side of the lower housing portion;

a scan generating mechanism for projecting a scan pattern out through the first vertical window and into a scan region;

a removable weigh platter having (a) a horizontal section disposed over the lower housing portion, (b) a first vertical section rigidly connected to the horizontal section, the first vertical section including an opening disposed adjacent the first vertical window through which the scan pattern from the vertical window is passed.

21. An optical reader according to claim 20 wherein the horizontal and vertical sections of the weigh platter are constructed and interconnected with sufficient rigidity such that an object is accurately weighed when placed with one end on the horizontal section and one end on the first vertical section.

22. An optical reader according to claim 20 wherein the horizontal and vertical sections of the weigh platter are constructed and interconnected with sufficient rigidity such that weight of an object placed with one end on the horizontal section and one end on the first vertical section does not cause deformation of the weigh platter to a degree that the first upper housing portion would interfere with movement of the weigh platter during weighing.

23. An optical reader according to claim 20 wherein the weigh platter comprises stiffening ribs for providing structural rigidity.

24. An optical reader according to claim 20 further comprising
at least one load cell;
a spider connected to at the least one load cell for supporting the weigh platter.

25. An optical reader according to claim 20 wherein the weigh platter is readily removable from the optical reader by pulling up on the platter.

26. An optical reader according to claim 20 further comprising at least one load cell and a coupling mechanism for rigidly but removably connecting the weigh platter to the load cell.

27. An optical reader according to claim 20 wherein the weigh platter further having (c) a second vertical section rigidly connected to the horizontal section, the second vertical section being disposed on a side of the weigh platter opposite the first vertical section.

28. An optical reader according to claim 27 wherein the horizontal section and the vertical sections of the weigh platter are constructed and interconnected with sufficient rigidity such that an object is accurately weighed when placed with one end on the horizontal section and one end on a vertical section.

29. A weigh platter for an optical reader, the optical reader having a horizontal surface and a vertical scan window disposed to one side of the horizontal surface, said weigh platter comprising
a horizontal section constructed and arranged for positioning over the horizontal surface of the optical reader; and
a vertical section first rigidly connected to said horizontal section, said vertical section including an opening constructed and arranged for permitting a scan pattern emanating out from said vertical scan window to pass through said opening.

30. A weigh platter according to claim 29 wherein the horizontal and vertical sections are constructed and arranged with sufficient rigidity such that an object is accurately weighed when placed with one end on the horizontal section and one end on the vertical section.

31. A weigh platter according to claim 29 wherein the opening of the vertical section comprises a window.

32. A weigh platter according to claim 29 further comprising
a second vertical section rigidly connected to the horizontal section, the second vertical section being disposed on a side of the weigh platter opposite the first vertical section.

33. A weigh platter according to claim 32 wherein the first and second vertical sections are constructed and interconnected with the horizontal section with sufficient rigidity such that an object is accurately weighed when placed with one end on the horizontal section and one end on a vertical section.

34. An optical reader comprising
a reader housing including a lower housing portion and a first upper housing portion, the first upper housing portion having a first vertical window positioned above and to one side of the lower housing portion;

a scan generating mechanism for projecting a scan pattern out through the first vertical window and into a scan region;

a removable weigh platter having (a) a horizontal section disposed over the lower housing portion, and (b) a first vertical extension connected to the horizontal section and extending vertically upward from a top surface of the horizontal section, wherein the horizontal section and the vertical extension of the weigh platter are constructed and interconnected such that an object is accurately weighed when placed with one end on the horizontal section and one end on the first vertical extension.

35. An optical reader according to claim 34 wherein first vertical extension has an opening between a top portion of the vertical extension and a top surface of the horizontal section of the weigh platter.

36. An optical reader according to claim 35 wherein the opening in the first vertical extension comprises a window.

37. An optical reader according to claim 34 wherein the weigh platter is readily removable from the optical reader pulling up on the platter.

38. An optical reader according to claim 34 further comprising at least one load cell and a coupling mechanism for rigidly but removably connecting the weigh platter to the load cell.

39. An optical reader according to claim 34 wherein the vertical extension is disposed on a side of the weigh platter proximate the first vertical window.

40. An optical reader according to claim 34 wherein the vertical extension is disposed on a side of the weigh platter opposite the first vertical window.

41. An optical reader according to claim 34 wherein the reader housing further comprises a second upper housing portion having a second vertical window positioned above and to one side of the lower housing portion opposite the first upper housing portion, wherein the weigh platter having a second vertical extension, wherein the first vertical extension is disposed on a side of the weigh platter proximate the second vertical window and the second vertical extension is disposed on a side of the weigh platter proximate the first vertical window.

42. An optical reader comprising horizontal housing portion including a horizontally-oriented scan window, a weigh platter disposed over the horizontal housing portion, the weigh platter comprising a horizontal section constructed and arranged for positioning over the horizontally-oriented scan window; and a vertical extension connected to said horizontal section, said vertical extension including an opening proximate a top surface of the horizontal section, wherein the vertical extension and the horizontal section are constructed and interconnected such that an object is accurately weighed when placed with one end on the horizontal section and one end on the vertical extension.

43. A weigh platter according to claim 42 wherein the opening of the vertical extension comprises a window.

* * * * *